(12) United States Patent
Klein et al.

(10) Patent No.: US 7,174,168 B2
(45) Date of Patent: Feb. 6, 2007

(54) METHOD OF CALL ROUTING IN A PUBLIC/PRIVATE COMMUNICATION SYSTEM

(75) Inventors: David E. Klein, Davie, FL (US); Richard S. Young, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 157 days.

(21) Appl. No.: 10/893,654

(22) Filed: Jul. 16, 2004

(65) Prior Publication Data

US 2006/0014540 A1   Jan. 19, 2006

(51) Int. Cl.
*H04Q 7/20* (2006.01)
*H04B 1/38* (2006.01)

(52) U.S. Cl. .................. 455/445; 455/556.1; 455/90.2; 340/7.21

(58) Field of Classification Search ................ 455/445, 455/517–519, 556.1, 569.1, 557, 90.1–90.3; 340/7.21
See application file for complete search history.

(56) References Cited

U.S. PATENT DOCUMENTS

| | | | |
|---|---|---|---|
| 5,862,208 A | | 1/1999 | McLampy |
| 5,940,767 A | * | 8/1999 | Bourgeois et al. .......... 455/466 |
| 5,978,689 A | * | 11/1999 | Tuoriniemi et al. ....... 455/569.1 |
| 6,226,529 B1 | * | 5/2001 | Bruno et al. ................ 455/557 |
| 6,230,029 B1 | * | 5/2001 | Hahn et al. .............. 455/575.2 |
| 6,314,303 B1 | * | 11/2001 | Phipps ....................... 455/555 |
| 6,459,371 B1 | * | 10/2002 | Pike ......................... 340/539.1 |
| 6,480,714 B1 | * | 11/2002 | DePani et al. ........... 455/422.1 |
| 6,606,506 B1 | * | 8/2003 | Jones .......................... 455/566 |
| 2005/0032539 A1 | * | 2/2005 | Noel et al. .................. 455/518 |

FOREIGN PATENT DOCUMENTS

| | | |
|---|---|---|
| WO | 2004028013 | 4/2004 |
| WO | 2004028026 | 4/2004 |

\* cited by examiner

*Primary Examiner*—Duc M. Nguyen
*Assistant Examiner*—Michael Thier
(74) *Attorney, Agent, or Firm*—Barbara R. Doutre

(57) ABSTRACT

A public/private communication system is provided which includes a public communication device 100, a private communication device (102) and a radio accessory extension (RAE) 200 coupled therebetween. The RAE (200) of the present invention provides audio and/or display capability which allows the public communication device to operate as a private communication accessory. Methods (300, 400 500) provide for the configuration and prioritization of private and public calls through the three devices to ensure that private calls will take priority and public calls will be received on the public communication device and handled appropriately.

16 Claims, 5 Drawing Sheets

METHOD OF CALL ROUTING IN A PUBLIC/PRIVATE COMMUNICATION SYSTEM

FIELD OF THE INVENTION

This invention relates generally to communication devices, and more particularly to call routing for devices that adapt to various usage public/private environments.

BACKGROUND OF THE INVENTION

Communication systems play a critical role in public safety. Remote speaker microphones are used in conjunction with portable two-way radios to increase a user's mobility. Such devices are typically used by public safety personnel, for example, fire fighters, police officers and medical rescue personnel. These users are also beginning to increasingly rely on their cellular telephones for non-critical communication. However, cellular telephones typically lack high audio capability making them unsuitable for most public safety applications. The ability to have a cellular telephone or other public communication devices operate in the public safety arena is a highly beneficial feature for public safety users.

Publications WO2004028013 A1 and WO2004028026 A1 teach a portable communication device operating as an accessory (i.e., a high audio speaker/microphone) for a portable two-way radio operating over a private or public system. The portable communication device is selected from a group consisting of, but not limited to, a cellular telephone, a personal digital assistant ("PDA"), a pager, a two-way radio, any combination thereof, or the like. Publications WO2004028013 A1 and WO2004028026 A1 are hereby incorporated by reference.

Publication WO2004028013 A1 teaches a portable communication device capable of coupling to a two-way radio via an interface. The portable communication device is capable of selectively functioning as an accessory for the two-way radio and as a standalone communication device when coupled to the two-way radio.

Publication WO2004028026 A1 teaches a mobile communication system comprising a two-way radio console and a portable communication device. The two-way radio console has a docking interface formed therein. The portable communication device is capable of coupling to the two-way radio console via the docking interface. Further, the portable communication device is capable of selectively functioning as an accessory for the two-way radio console and as a standalone communication device when coupled to the two-way radio console. The accessory is at least one of the following: a microphone, a speaker, and a two-way controller.

Combining functionality and adding features to communications products such that multiple communication devices take on new functional capabilities is highly desirable. Prioritizing and routing calls is critical to the proper operation of combined systems in order to avoid conflicts and to ensure that the most important calls get through first. The ability to prioritize and route calls through an interface within a public/private system is addressed herein.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
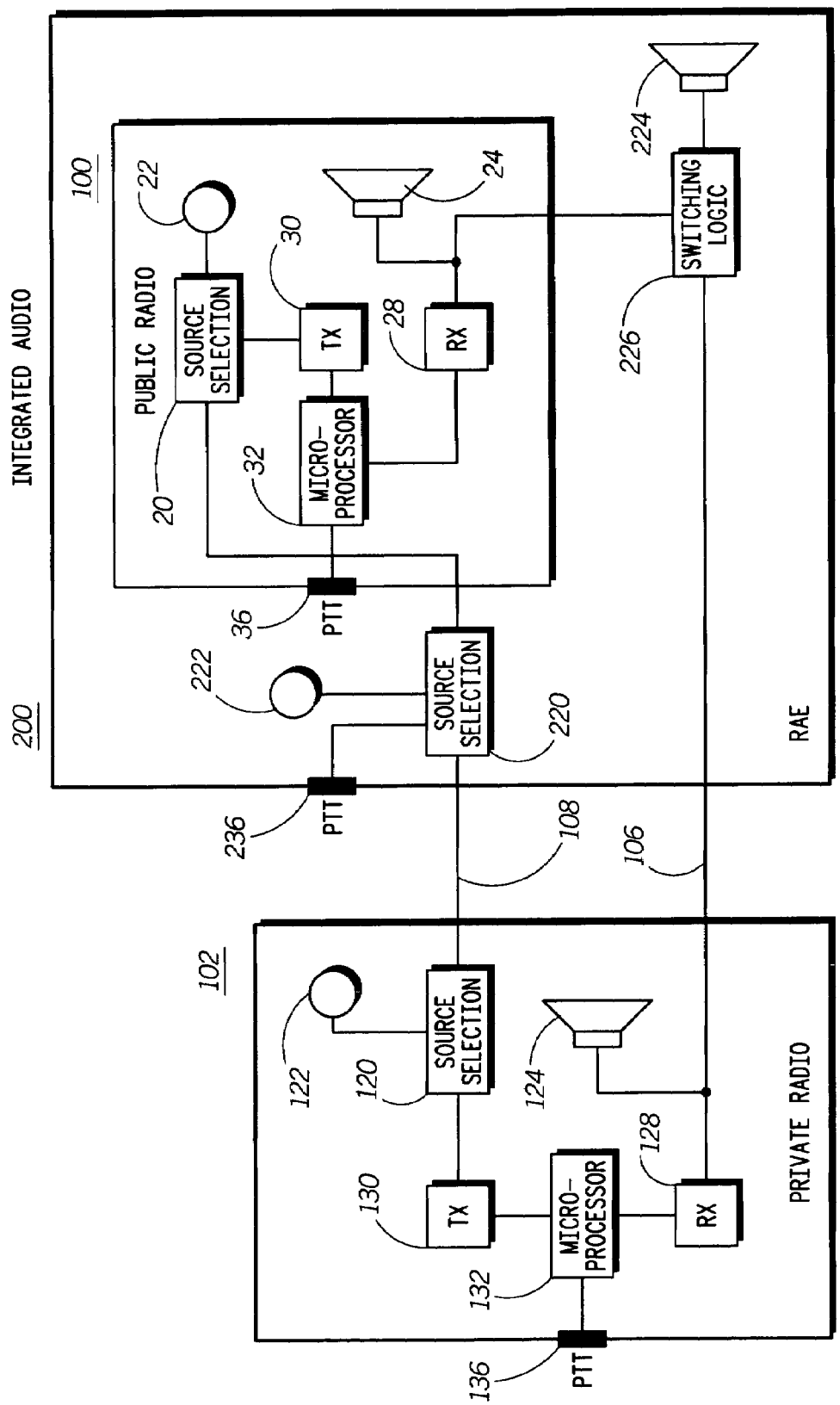
FIG. 1 is an electrical block diagram of a public/private communication system configured for audio routing in accordance with the present invention.

While the specification concludes with claims defining the features of the invention that are regarded as novel, it is believed that the invention will be better understood from a consideration of the following description in conjunction with the drawing figures, in which like reference numerals are carried forward.

Figure 2:
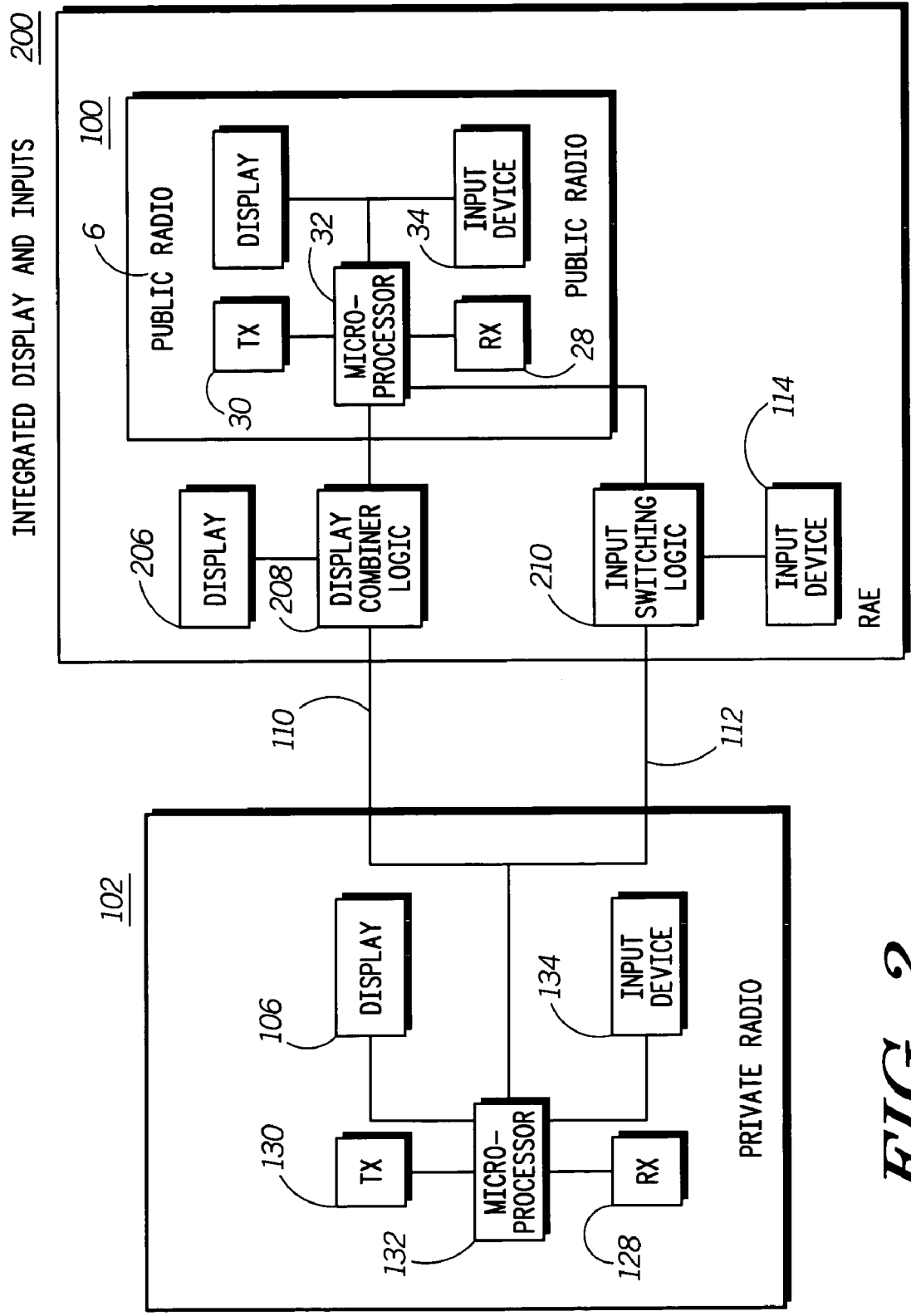
FIG. 2 is an electrical block diagram of a public/private communication system configured for display routing in accordance with the present invention.

Referring to FIGS. 1 and 2, there is shown a block diagram of a public/private communication system consisting of a public communication device 100, a private communication device 102, and in accordance with the present invention, a radio accessory extension (RAE) 200 coupled therebetween. The radio accessory extension 200 can take on the form of a cradle or holster for receiving the public communication device 100 or can alternatively have the public communication device integrated therein. The private communication device 102 is preferably a private two-way radio. The public communication device may be a dispatch radio, a duplex radio and/or data device such as a personal digital assistant (PDA). In accordance with the present invention, the RAE 200 provides integration of audio and/or display functionality. In accordance with the present invention, the functionality of the RAE 200 is described herein, first in terms of audio routing described in conjunction with FIG. 1 and then in terms of display routing described in conjunction with FIG. 2. For the purposes of this application a "call" can be either audio or data.

In accordance with the present invention, a user is alerted to an incoming call by the private communication device 102, the public communication device 100 and/or the RAE 200. For the audio routing embodiment of FIG. 1, the user is alerted to an incoming call via speaker 24 of the public communication device 100, speaker 124 of the private communication device 102 and/or speaker 224 of the RAE 200. Which of these devices will alert the user to the incoming call is dependent upon the enablement of switching logic 226 located in the RAE 200. Switching logic 226 is inter-operatively coupled 106 to and controlled by microprocessor 132 and receiver 128 of private communication device 102 and microprocessor 32 and receiver 28 of public communication device 100. The switching logic 226 can be configured to alert the user of an incoming call at either the speaker 224 of the RAE 200, speaker 124 of the private communication device 102 and/or speaker 24 of the public communication device 100. These configurations can include but are not limited to, a device identified as a main device, a default device (i.e. public call to public device), or even all three devices with audio routing decided upon which device the user interacts with first.

Each device 100, 102 and 200 includes a push-to-talk (PTT) control 36, 136 and 236 respectively. In accordance with the present invention, a user can respond to an incoming call using the PTT of the device that alerted the user of the call or using a preconfigured arrangement stored in private communication device 102. Corresponding microphones 22, 122 and 222 for each device are enabled/disabled by public communication device source selection 20, private communication device source selection 120, and RAE source selection 220 respectively. Source selections 20, 120 and 220 are inter-operatively coupled 108 to and controlled by public communication device microprocessor 32 and transmitter 30 and private communication device transmitter 130 and microprocessor 132.

In accordance with the present invention, PTT 236 is coupled to source selection 220 of the RAE 200 as is microphone 222. There is no microprocessor required in the RAE 200. As mentioned above, incoming alerts and incoming audio calls can be heard at either speaker 24, 124 or 224 depending on how the system was initially configured. However, the user can respond to the call by pressing a PTT and speaking into the microphone of a different device. Thus, a user, such as a police officer can receive a call on a private two-way radio worn on a belt but answer the call by pressing the PTT and speaking into the microphone of a public communication device or RAE worn on the officer's shoulder. Thus, a private call can be received on a private device but answered using a public device.

As was described in the incorporated references, it is important to note that while the public communication device 100 is coupled to the private two-way radio 102, priority is given to the speaker/microphone functionality of the public communication device 100 when communication over the two-way radio 102 is active (i.e., the public communication device 100 as used in the two-way radio environment). Precedence given to the two-way radio environment allows this combination of devices to be suitable for public safety or other environments requiring mission critical applications. Thus, the intended/standard mode of operation for the public communication device 100 can be selectively suspended or temporarily disabled while the public communication device 100 is coupled to the two-way radio 102, and preferably, when communication over the two-way radio 102 is active. For example, assume that the public communication device 100 is a cellular telephone and its intended mode of operation is cellular telephone services (e.g., receiving and placing telephone calls over the cellular system). If the user is engaged in a cellular call over the public cellular system and a dispatch (two-way) call over the two-way radio system is received, the cellular call is selectively suspended (i.e., placed on hold, call forwarded, transitioned to a busy signal, or the like) until the communication channel for the private two-way radio system becomes idle (i.e., communication over the two-way radio 102 is not active), in which time, the cellular call is resumed, or until a predetermined time has elapse, at which time, the cellular call is dropped (preferably with a message being provided to the other party of the cellular call). While the cellular telephone 100 is coupled to the two-way radio 102, all cellular calls received by the cellular telephone 100 while communication is active over the two-way radio 102 is directed to voice mail or a prerecorded message until the communication over the two-way radio 102 is no longer active. The user is subsequently notified of any messages that were left while the cellular telephone 100 was functioning as at least one of a high audio speaker and/or microphone accessory for the two-way radio 102. Alternatively, while the cellular telephone 100 is coupled to the private two-way radio 102, the system can direct all cellular telephone calls to voice mail or a prerecorded message until the cellular telephone 100 is decoupled from the two-way radio 102; this alternative is not as optimal as temporarily suspending a subset of functionality of the public communication device 100 because it is not likely that the user will carry the public communication device 100 if a subset of functionality is disabled (i.e., disabling intended functionality of the public communication device) while coupled to the two-way radio 102.

For the display routing embodiment of FIG. 2 of the present invention, the public communication device can be a cellular phone having data capability or alternatively any public data device such as a pager or PDA having data transmission and receive capability. Again for the purposes of this application, a call can be data as well as audio. In accordance with the present invention, the user is alerted to an incoming call via display 6 of the public communication device 100, display 106 of the private communication device or display 206 of the RAE 200. Which of these devices will alert the user to the incoming call is dependent upon the enablement of display combiner logic 208 located in the RAE 200. The display combiner logic 208 is inter-operatively coupled 110 to and controlled by public communication device microprocessor 32 and private communication device microprocessor 132. Corresponding displays 6, 106 and 206 for each device are enabled/disabled by display combiner logic 208. In accordance with the present invention, input switching logic 210 of the RAE 200 is inter-operatively coupled 112 to and controlled by public communication device microprocessor 32 and private communication device microprocessor 132. The user will respond to an incoming call by entering data using the device that alerted the user of the call. Input device 114 receives input from a user via a keypad, button or other interface means. In accordance with the present invention, input device 114 controls switching logic 210 thus providing a user-configurable system that allows a user to opt to receive and transmit a public or private data call via the RAE 200.

In accordance with the present invention, the user initiates a private or public call by entering data using the device previously enabled for user input or the system can be configured to detect active input device selection. If the RAE 200 is utilized for data input, the data will be transmitted via public communication device transmitter 30 or private communication device transmitter 130 depending on the input switching logic 210. Again, input device 114 is used to control switching logic 210 thus allowing the user to configure the system to opt for receiving and transmitting data via the RAE 200. If the data is inputted via the private radio input device 134, the data will be transmitted via the transmitter 130. If the data is inputted via the public input device 34, the data will be transmitted via transmitter 30.

As was described in the incorporated references, the public communication device 100 functions in its intended/standard mode of operation when operating as a stand-alone device in its intended environment. For example, if the public communication device 100 is a cellular telephone, its intended mode of operation is to provide cellular telephone services; if the public communication device 100 is a PDA, its intended mode of operation is a handheld computing device. The public communication device 100 may have similar functionalities of a laptop or desktop computer including, but not limited to, email capabilities, calendar maintenance, word/data processing, spreadsheet capabilities, contact list generation, internet surfing or the like; the public communication device 100 may even be configured with a wireless local area network ("WLAN") personal computer memory card international association ("PCM-CIA") card or a compact flash card for wireless access.

Figure 3:
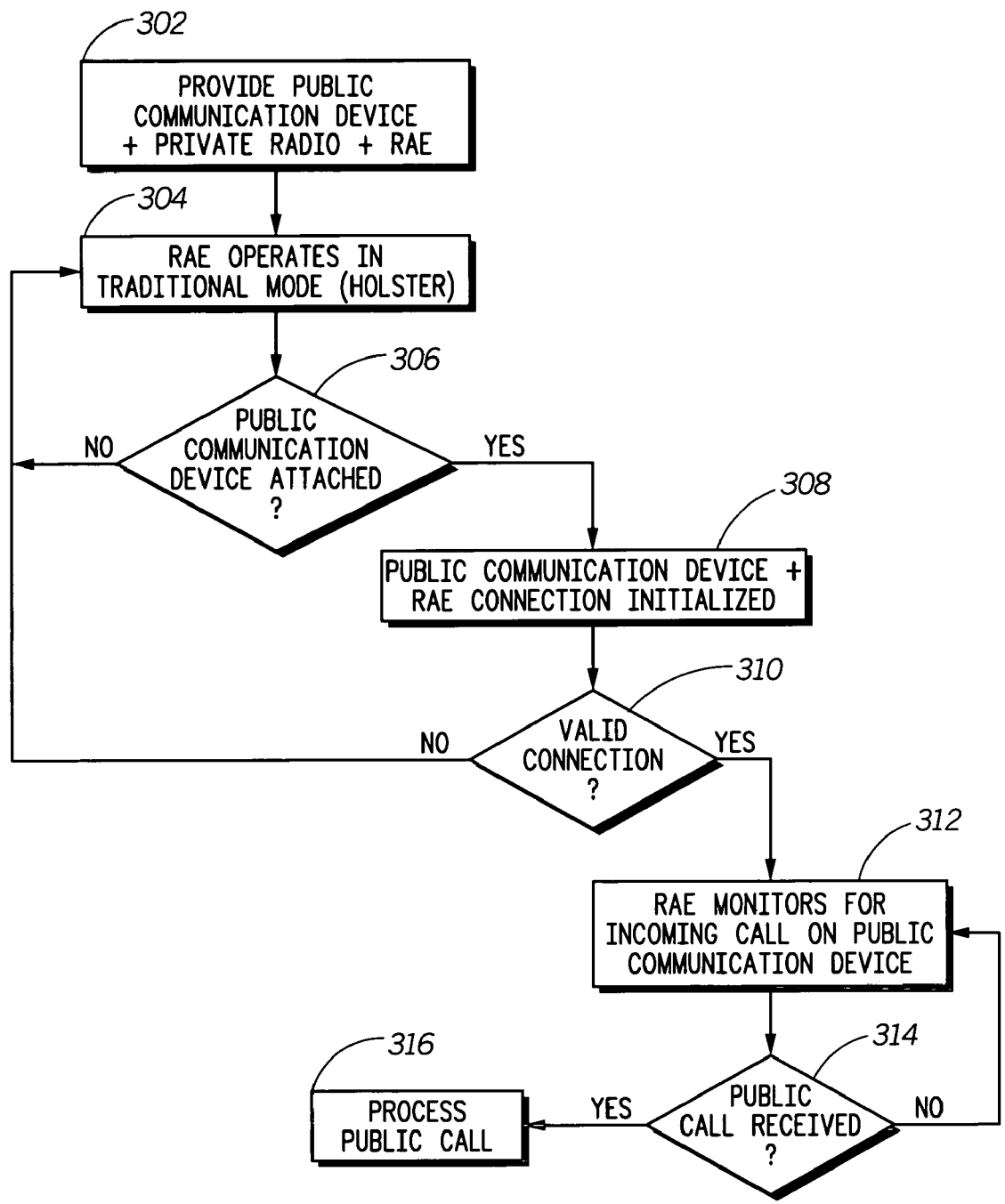
FIG. 3 is a method of controlling the radio accessory extension (RAE) under interactive RAE conditions in accordance with the present invention.

FIG. 3 is a method of controlling the radio accessory extension (RAE) 200 under interactive RAE conditions in accordance with the present invention. Method 300 provides for initializing the public/private communication system for receipt of a public call which will be followed by the method 400 of FIG. 4 which goes through the actual public call processing and prioritizing steps. FIG. 5 provides a method 500 for the call processing of an incoming private call and prioritizing steps. As mentioned previously, for the purposes of this application a call can be either audio or data.

For the purposes of methods 300, 400 and 500 the private communication device will be described as a private radio, the private radio being a private two-way radio operating in the public safety environment. Beginning at step 302, a public communication device, such as a dispatch radio, duplex radio or PDA, a private radio and a radio accessory extension (RAE) coupled therebetween are provided. In accordance with the present invention, the RAE provides integration of audio and/or display functionality. The RAE initially operates in a traditional default private mode at step 304 and will continue to operate in that private mode unless coupled to a public radio.

The step of detecting the presence of a public communication device being coupled to the RAE occurs at step 306. Upon confirmation of the RAE being coupled to (or alternatively integrated within) the public communication device, the connection between the RAE and public communication device is initialized at step 308. If a valid connection is determined at step 310, then the public communication device begins monitoring for the incoming public call and the RAE monitors the alert status on the public communication device at step 312. If a public call is received at step 314, the public call is processed at step 316 in the manner described in FIG. 4.

Figure 4:
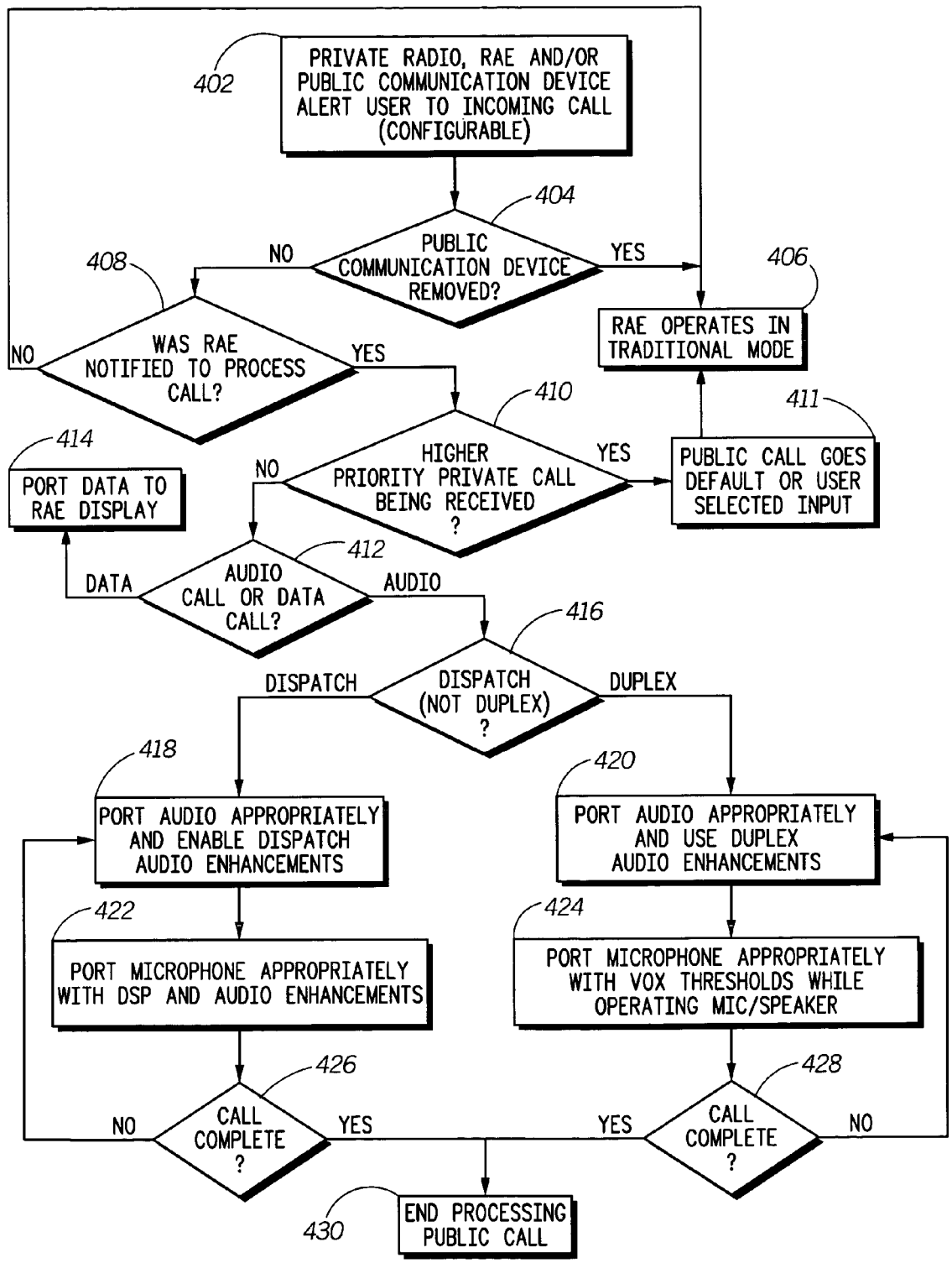
FIG. 4 is a method of processing a public call through the public/private communication system in accordance with the present invention.
Figure 5:
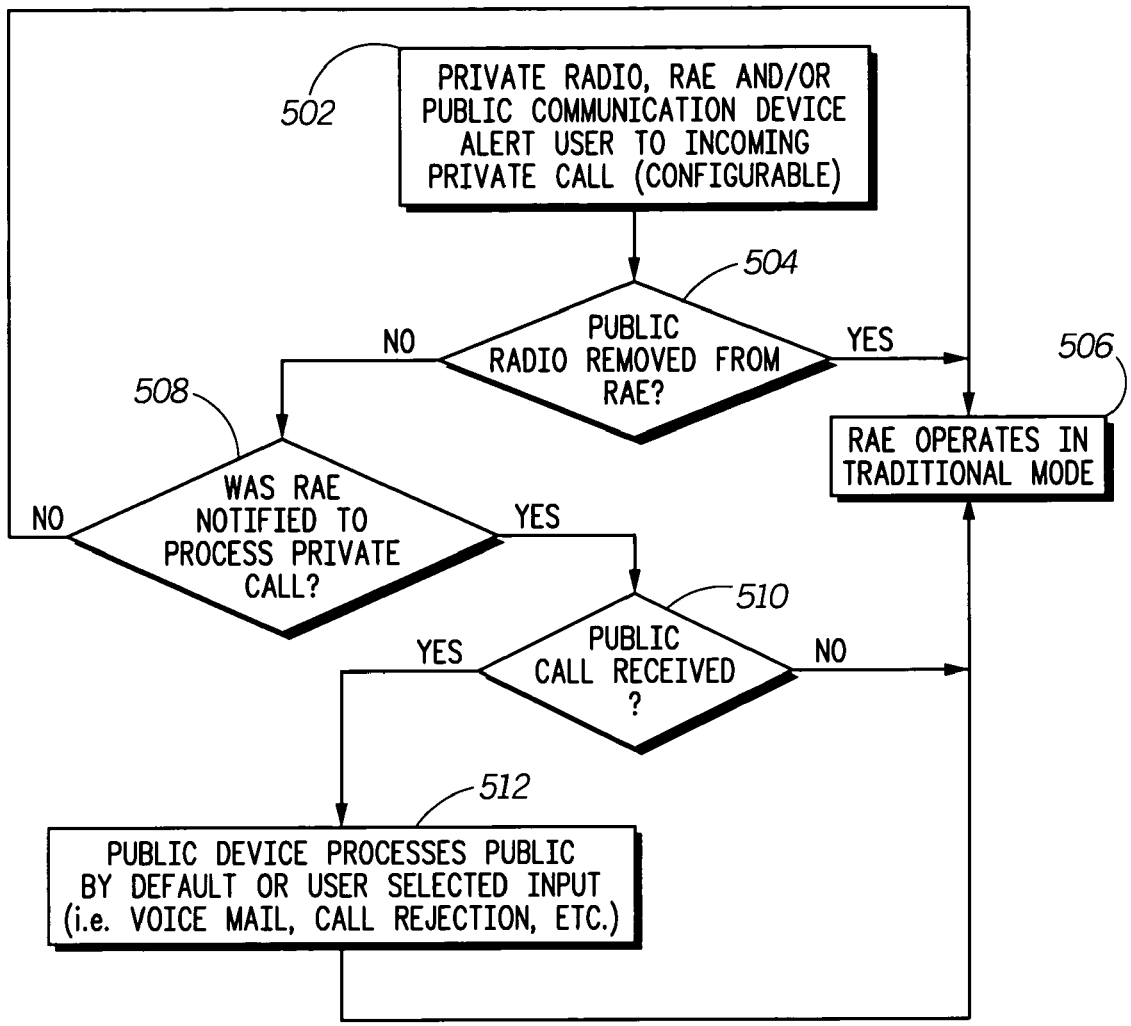
FIG. 5 is a method of processing a private call through the public/private communication system in accordance with the present invention.

FIG. 4 shows the method of processing the public call through the portable public/private communication system in accordance with the present invention. At step 402, the user is alerted to an incoming public call. This alert can occur on one or more of the private radio, public communication device or RAE—depending on how the user has configured the RAE.

Step 404 determines whether the public communication device has been removed from the RAE. If the public communication device has been removed, then the RAE operates in traditional mode at step 406 (i.e. default private mode) and the public call will come through on the public communication device. If the public communication device has not been removed from the RAE, then a check is performed at step 408 to determine whether the RAE was notified to process the incoming public call. If the RAE was not notified to process the incoming public call at step 408, then the process returns to step 406 where the RAE returns to a traditional mode of operation which basically causes the system to wait until the public device is replaced and the next public or private call comes in.

If the RAE was notified to process the incoming public call at step 408, then the step of determining whether a higher priority private call is being received by the private radio occurs at step 410 and if so, the RAE returns to operate in the traditional mode (i.e. the default private mode) at step 406 to give priority to and process the incoming private call. Meanwhile the public call is handled by a default or user selected input at step 411.

If the private radio is not receiving a higher priority private call at step 410, then the step of determining whether the incoming call consists of audio or data is determined at step 412. For data, the incoming public call data gets ported to the RAE display at step 414. For audio, the step of determining whether the public communication device is a dispatch device or a duplex device occurs at step 416. Depending on the operating mode (dispatch or duplex), the RAE identifies the audio porting process as defined by the user configuration. Thus, for dispatch routing at step 418, the received audio is routed as configured by the user at step 402 and additional dispatch audio enhancements, if any, can be enabled.

Transmitted audio is then routed at step 422 from a microphone as defined by the appropriate PTT switch. If the RAE PTT switch is used, then the RAE microphone is utilized. Additional audio enhancements and handling for dispatch audio can also be enabled.

For duplex routing, at step 420 the received audio is routed as configured by the user at step 402 and additional duplex audio enhancements, if any, can be enabled. If the public device is operating in duplex mode and the audio is routed to the RAE microphone, the RAE can react to the audio in a customer configurable response. This includes but is not limited to enablement of VOX, muting of microphone, enhanced DSP functionality, to name a few. Transmitted audio is routed at step 424, the transmitted audio is routed through the appropriate microphone as was configured back at step 402 or possibly one of several other approaches, such as by pressing of a PTT switch, microphone threshold for VOX.

Processing of the public call is ended at step 430 upon completion of the public call or upon receipt of an incoming private call at step 426 (dispatch) or step 428 (duplex).

FIG. 5 is a method 500 of processing a private call in the portable public/private communication system in accordance with the present invention. Beginning a step 502, the user is alerted to the incoming private call. This alert can take place on any of the three devices the RAE, the public communication device or private radio as previously configured by the user.

The step of detecting whether the public communication device has been removed from the RAE occurs at step 504. If the public communication device has been removed at step 504, the RAE operates in traditional private mode at step 506 and only the private radio will process the private call. If however, the public communication device has not been removed from the RAE, as determined at step 504, then an inquiry is made as to whether the RAE has been notified to process the private call at step 508. If the RAE has not been notified to process private calls, the private radio will do so back at step 506. If the RAE has been notified to process the private call at step 508 then a check is first made at step 510 to determine if there is an incoming lower priority public call. If there is no incoming lower priority public call detected at step 510, then the RAE proceeds to process the incoming private call through the RAE at step 506. If however, a public call is received at step 510, then the public communication device processes the public call using a default or user selected input such as voice mail, call rejection, etc. at step 512 and the private call is routed to the RAE at step 506 as the priority call.

The prioritization of calls through the public/private communication system of the present invention extends to the mobile environment as well. In FIGS. 1 and 2, the private communication device 102 can be a two-way radio console forming a mobile communication system. The public communication device 100 couples to the console through the RAE 200 to provide mobile radio controls for the console. When detached from the two-way radio console, the public communication device 100 operates in one of two modes: in a first mode, depending on the range of the public communication device 100 with respect to the two-way radio console, the public communication device 100 can provide an additional link for out-of-vehicle use for the two-way radio console; in a second mode, the public communication device 100 functions in its intended/standard mode of operation. The prioritization follows the same methods as those described in the methods 300, 400 and 500.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method of processing a public call through a public/private communication system, comprising the steps of:
    providing a private communication device, a public communication device and a radio accessory extension (RAE) coupled therebetween, the RAE providing audio and display functionality;
    configuring at least one of the private communication device, the public communication device and the RAE to alert a user to an incoming call (public or private) call, thereby providing at least one configured device;
    detecting the presence of the public communication device being coupled to the RAE;
    monitoring for the incoming public call at the public communication device;
    alerting the user of the incoming public call using the at least one configured device;
    determining whether a higher priority private call is being received by the private communication device, and if so, operating the RAE in a default private mode to process the higher priority private call;
    if a higher priority private call was not received, then:
        determining whether the incoming public call is an audio call or a data call;
        for a data call, porting the data to a display of the RAE or the public communication device;
        for an audio call, determining whether the public communication device is a dispatch device or a duplex device;
        routing the audio call through the RAE to the at least one configured device;
        for dispatch, detecting transmitted audio via a push-to-talk (PTT) press;
        for duplex, detecting audio via a microphone of the at least one configured device; and
    ending the public call.

2. The method of claim 1, wherein the public communication device is integrated within the RAE.

3. The method of claim 1, wherein the audio and display functionality is controlled via a user input source.

4. The method of claim 1, wherein the RAE is externally coupled to public communication device.

5. The method of claim 1, wherein the private communication device is a portable private two-way radio operating in the public safety environment.

6. The method of claim 1, wherein the private communication device is a mobile private two-way radio operating in the public safety environment.

7. A method of processing a private call through a public/private communication system, comprising the steps of:
    providing a private communication device, a public communication device and a radio accessory extension (RAE) coupled therebetween, the radio accessory extension providing audio and display functionality, the RAE being configurable;
    detecting the presence of a public communication device being coupled to the RAE;
    monitoring for an incoming private call at the private communication device; alerting a user of the incoming private call using one of the public communication device, the private communication device and the RAE;
    determining whether a lower priority public call is being processed by the public communication device, and if so, signaling the public communication device to process the public call via one of a default and user input request;
    processing the private call via the RAE in a default private mode, in which;
        for a data call, porting the data to a configured display of the RAE or private device;
        for an audio call, determining whether the call is a dispatch call or a duplex call;
        porting the audio through the RAE to one of the public communication device and the RAE, as preconfigured by the RAE; and
        enabling audio enhancements based on whether the ported audio is duplex or dispatch.

8. The method of claim 7, wherein the public communication device is integrated within the RAE.

9. The method of claim 7, wherein the audio and display functionality is controlled via a user input source.

10. The method of claim 7, wherein the RAE is externally coupled to public communication device.

11. The method of claim 7, wherein the private communication device is a portable private two-way radio operating in the public safety environment.

12. The method of claim 7, wherein the private communication device is a mobile private two-way radio operating in the public safety environment.

13. A method of processing a call through a public/private communication system, comprising the steps of:
    providing a private communication device, a public communication device and a radio accessory extension (RAE) coupled therebetween, the RAE providing at least one of audio and display functionality, the RAE being configurable;
    detecting the presence of the public communication device being coupled to the RAE;
    monitoring for an incoming call at the public and private communication devices;
    alerting a user of an incoming call using one of the private communication device, a public communication device and the RAE;

determining whether the incoming call is a public call or a private call;

prioritizing the private call;

processing the private call through one of the private communication device and RAE;

processing the public call with a default; and responding to the private call through the one of the private device and RAE;

determining whether the incoming private call is an audio call or a data call;

for a data call, porting the data to a display of the private device or pre-configured RAE;

for an audio call, determining whether the public communication device is a dispatch device or a duplex device;

porting audio through the pre-configured RAE to the public communication device; and enabling audio enhancements in the public communication device based on whether the ported audio is duplex or dispatch; and ending the call.

14. The method of claim 13, further comprising, after the step of providing the step of pre-configuring the RAE to process a private call.

15. The method of claim 13, further comprising the step of utilizing a push-to-talk (PTT) and microphone of the RAE to respond to the private call for a dispatch device.

16. The method of claim 13, further comprising the step of utilizing a microphone of the RAE to respond to the private call for a duplex device.

* * * * *